US009246941B1

(12) United States Patent
Gibson et al.

(10) Patent No.: US 9,246,941 B1
(45) Date of Patent: Jan. 26, 2016

(54) SYSTEMS AND METHODS FOR PREDICTING THE IMPACT OF SECURITY-POLICY CHANGES ON USERS

(71) Applicant: Symantec Corporation, Mountain View, CA (US)

(72) Inventors: Douglas Gibson, Newton, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 39 days.

(21) Appl. No.: 13/779,550

(22) Filed: Feb. 27, 2013

(51) Int. Cl.
*H04L 29/06* (2006.01)

(52) U.S. Cl.
CPC ............ *H04L 63/20* (2013.01); *H04L 63/0263* (2013.01); *H04L 63/0227* (2013.01)

(58) Field of Classification Search
None
See application file for complete search history.

(56) References Cited

U.S. PATENT DOCUMENTS

| 2009/0007219 A1* | 1/2009 | Abzarian et al. ................ 726/1 |
| 2010/0050077 A1* | 2/2010 | Ryman ......................... 715/704 |
| 2010/0050229 A1* | 2/2010 | Overby, Jr. ..................... 726/1 |

* cited by examiner

*Primary Examiner* — Harunur Rashid
*Assistant Examiner* — Andrew Steinle
(74) *Attorney, Agent, or Firm* — ALG Intellectual Property, LLC (57) ABSTRACT

A computer-implemented method for predicting the impact of security-policy changes on users may include (1) identifying at least one end-user computing system that may potentially be regulated using a security policy, (2) predicting, prior to activating the security policy on the end-user computing system, how activating the security policy may impact at least one user of the end-user computing system by monitoring at least one behavior of the user on the end-user computing system and by determining how activating the security policy on the end-user computing system may have impacted the behavior, and (3) notifying, based at least in part on predicting how activating the security policy may impact the user, an administrator of the end-user computing system with information that indicates how activating the security policy may impact future user behavior. Various other methods, systems, and computer-readable media are also disclosed.

17 Claims, 6 Drawing Sheets

SYSTEMS AND METHODS FOR PREDICTING THE IMPACT OF SECURITY-POLICY CHANGES ON USERS

BACKGROUND

In the electronic information age, people may share, access, and disseminate high volumes of information. The ease of disseminating information electronically is empowering. At the same time, workforces have become increasingly mobile, and the ubiquity of high-speed Internet access and mobile computing systems (e.g., smartphones, tablets, and laptops) means that "the office" may be anywhere. As a consequence, it has become more difficult than ever for organizations to secure their sensitive data and IT infrastructure. Organizations are therefore increasingly looking to mobile-security solutions to better protect their mobile computing systems.

Conventional mobile-security systems may allow a mobile-security administrator to protect sensitive data and IT infrastructure by enforcing various security policies (e.g., data-loss-prevention policies, access-control policies, and endpoint-compliance policies) on mobile computing systems. Unfortunately, when a mobile-security administrator deploys new and/or modified security policies to mobile computing systems, the mobile-security administrator may risk causing unexpected and significant disruptions to workforce productivity and workflow when the new and/or modified security policies are activated and enforced. Accordingly, the instant disclosure addresses a need for additional and improved systems and methods for predicting the impact of security-policy changes on users.

SUMMARY

As will be described in greater detail below, the instant disclosure generally relates to systems and methods for predicting the impact of security-policy changes on users. In one example, a computer-implemented method for predicting the impact of security-policy changes on users may include (1) identifying at least one end-user computing system that may potentially be regulated using a security policy, (2) predicting, prior to activating the security policy on the end-user computing system, how activating the security policy may impact at least one user of the end-user computing system by monitoring at least one behavior of the user on the end-user computing system and by determining how activating the security policy on the end-user computing system may have impacted the behavior, and (3) notifying, based at least in part on predicting how activating the security policy may impact the user, an administrator of the end-user computing system with information that indicates how activating the security policy may impact future user behavior.

In some examples, the step of determining how activating the security policy on the end-user computing system may have impacted the behavior may include (1) detecting, at the end-user computing system, a condition that may have triggered enforcement of the security policy on the end-user computing system and (2) determining, in response to detecting the condition that may have triggered enforcement of the security policy, that enforcement of the security policy on the end-user computing system may have impacted the behavior.

In certain examples, the step of determining how activating the security policy on the end-user computing system may have impacted the behavior may include identifying, in response to detecting the condition that may have triggered enforcement of the security policy on the end-user computing system, the context within which enforcement of the security policy on the end-user computing system may have impacted the behavior and/or a workflow within which enforcement of the security policy on the end-user computing system may have impacted the behavior.

In at least one example, the step of predicting how activating the security policy may impact the user of the end-user computing system may include determining the number of times that enforcement of the security policy on the end-user computing system may have impacted the behavior while the behavior is monitored, the number of users that perform the behavior while the behavior is monitored, and/or how activating the security policy on the end-user computing system may have impacted the behavior of a group of users to which the user belongs.

In some examples, the step of notifying the administrator with information that indicates how activating the security policy may impact future user behavior may include notifying the administrator of the number of times that enforcement of the security policy on the end-user computing system will likely impact the behavior after the security policy is activated on the end-user computing system, the number of users that will likely attempt to perform the behavior after the security policy is activated on the end-user computing system, and/or how activating the security policy on the end-user computing system will likely impact the behavior of a user or a group of users of interest.

In certain examples, the computer-implemented method for predicting the impact of security-policy changes on users may also include notifying the user with information that indicates how activating the security policy may impact future user behavior, enabling the administrator to adjust the security policy prior to activating the security policy on the end-user computing system, and/or activating the security policy on the end-user computing system.

In one example, a system for implementing the above-described method may include (1) an identifying module programmed to identify at least one end-user computing system that may potentially be regulated using a security policy, (2) a predicting module programmed to predict, prior to activating the security policy on the end-user computing system, how activating the security policy may impact at least one user of the end-user computing system by monitoring at least one behavior of the user on the end-user computing system and by determining how activating the security policy on the end-user computing system may have impacted the behavior, a notifying module programmed to notify, based at least in part on predicting how activating the security policy may impact the user, an administrator of the end-user computing system with information that indicates how activating the security policy may impact future user behavior, and (4) a processor configured to execute the identifying module, the predicting module, and the notifying module.

In some examples, the above-described method may be encoded as computer-readable instructions on a computer-readable-storage medium. For example, a computer-readable-storage medium may include one or more computer-executable instructions that, when executed by a processor of a computing device, may cause the computing device to (1) identify at least one end-user computing system that may potentially be regulated using a security policy, (2) predict, prior to activating the security policy on the end-user computing system, how activating the security policy may impact at least one user of the end-user computing system by monitoring at least one behavior of the user on the end-user computing system and by determining how activating the security policy on the end-user computing system may have impacted the behavior, and (3) notify, based at least in part on predicting how activating the security policy may impact the user, an administrator of the end-user computing system with information that indicates how activating the security policy may impact future user behavior.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for predicting the impact of security-policy changes on users. As will be explained in greater detail below, by predicting, prior to activating new or modified security policies on end-user computing systems, how activating the security policies may impact users of the end-user computing systems, the systems and methods described herein may reduce or eliminate unexpected disruptions to user behaviors. Furthermore, in some examples, by collecting, prior to activating the security policies on end-user computing systems, information about behaviors that may be disrupted by enforcement of the security policies on the end-user computing systems, the systems and methods described herein may accurately predict how actual enforcement of the security policies will likely impact the future behavior of specific users or groups of user of interest Moreover, by providing to an administrator and/or users of the end-user computing systems information about how enforcement of the security policies on the end-user computing systems will likely impact future user behavior, these systems and methods may enable the administrator to adjust the security policies to reduce or eliminate any undesired impacts of the security policies and/or enable the users to prepare for any likely disruptions caused by the security policies. Embodiments of the instant disclosure may also provide various other advantages and features, as discussed in greater detail below.

Figure 1:
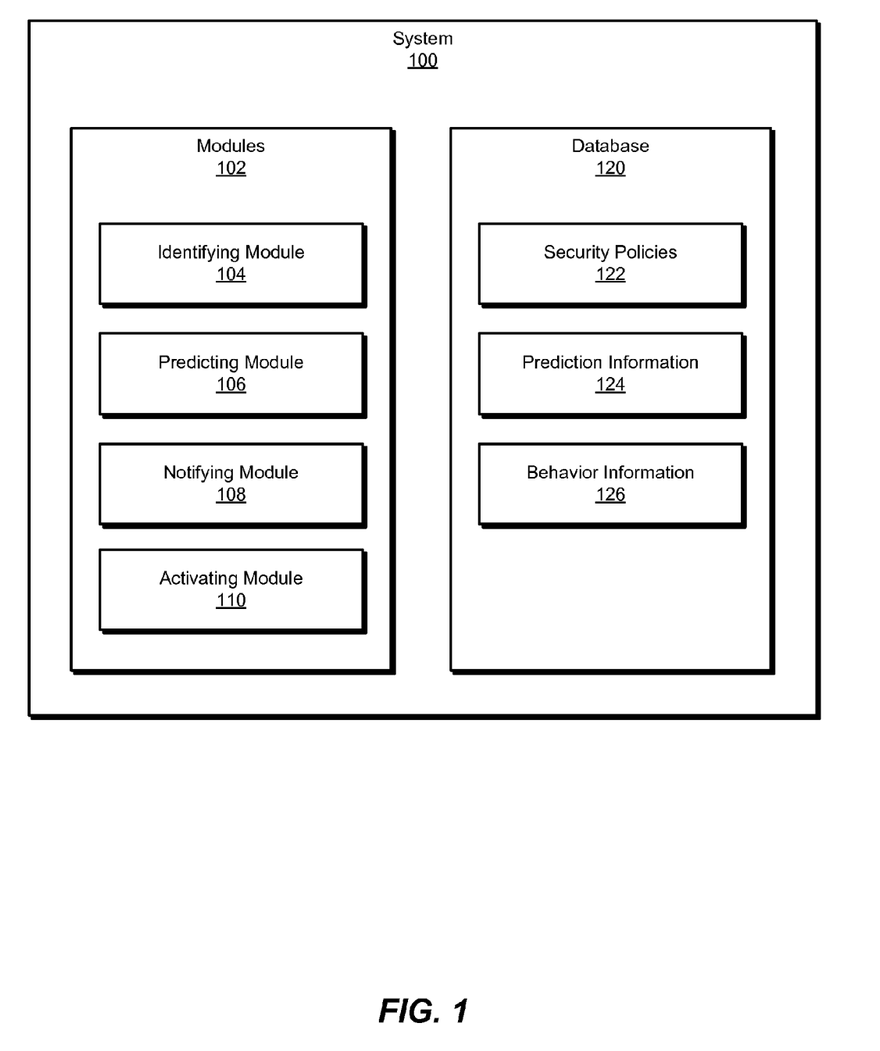
FIG. 1 is a block diagram of an exemplary system for predicting the impact of security-policy changes on users.
Figure 2:
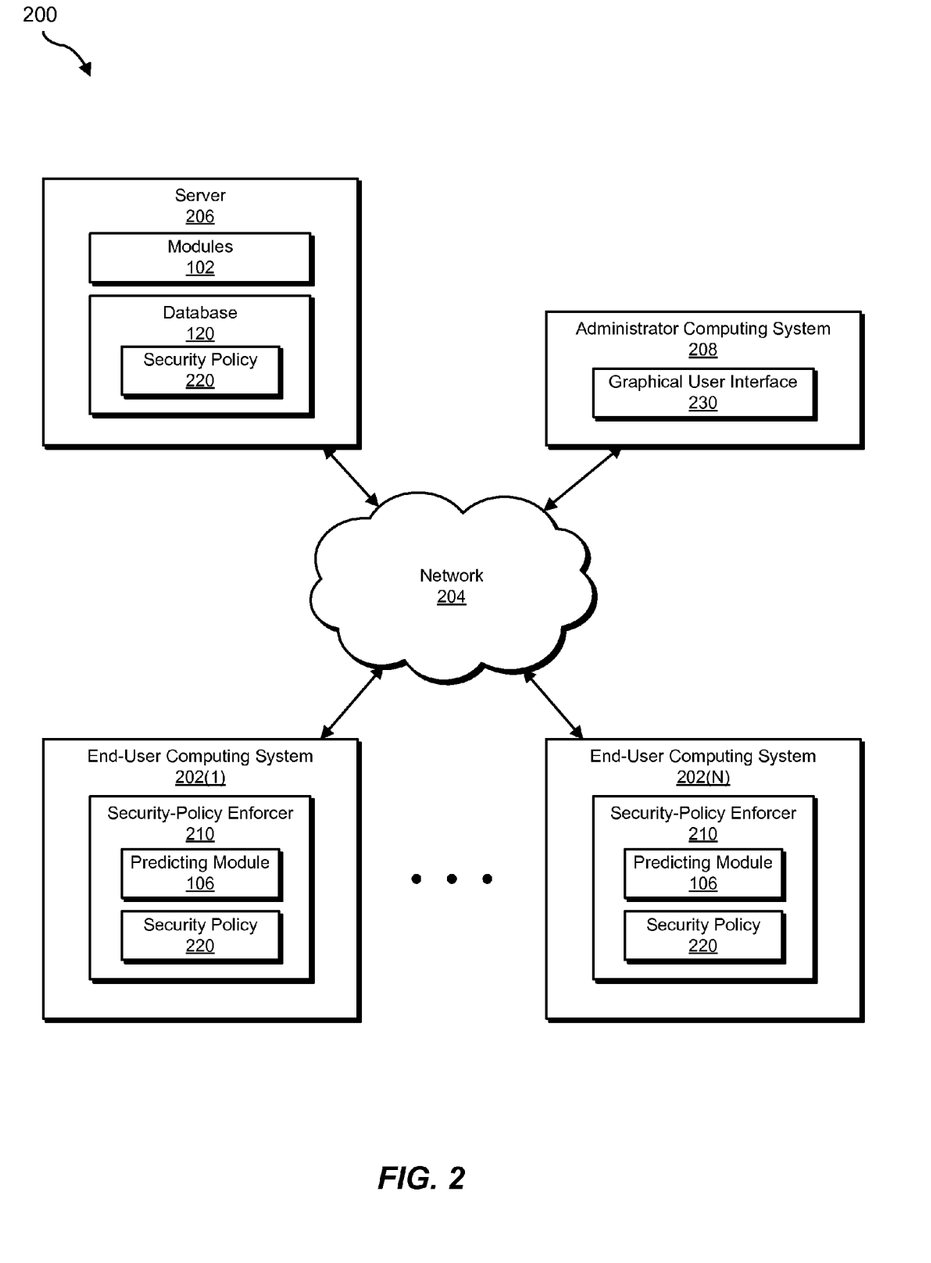
FIG. 2 is a block diagram of an exemplary system for predicting the impact of security-policy changes on users.

The following will provide, with reference to FIGS. 1-2, detailed descriptions of exemplary systems for predicting the impact of security-policy changes on users. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for predicting the impact of security-policy changes on users. As illustrated in this figure, exemplary system 100 may include one or more modules 102 for performing one or more tasks. For example, and as will be explained in greater detail below, exemplary system 100 may include an identifying module 104 programmed to identify at least one end-user computing system that may potentially be regulated using a security policy. Exemplary system 100 may also include a predicting module 106 programmed to predict how activating the security policy may impact at least one user of the end-user computing system by monitoring at least one behavior of the user on the end-user computing system and by determining how activating the security policy on the end-user computing system may have impacted the behavior.

In addition, and as will be described in greater detail below, exemplary system 100 may include a notifying module 108 programmed to notify an administrator of the end-user computing system and/or the user with information that indicates how activating the security policy may impact future user behavior. Exemplary system 100 may also include an activating module 110 programmed to activate the security policy on the end-user computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., end-user computing systems 202(1)-(N), server 206, and/or administrator computing system 208), computing system 510 in FIG. 5, and/or portions of exemplary network architecture 600 in FIG. 6. In at least one example, one or more of modules 102 may represent a portion of a system configured to manage and/or enforce security policies on end-user computing systems. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include security policies 122 for storing information about one or more security policies, prediction information 124 for storing information about how activating security policies may impact users, and/behavior information 126 for storing information about how activating security policies may impact user behavior (e.g., information about the contexts and workflows associated with impacted user behaviors).

Database 120 may represent portions of a single database or computing device or a plurality of databases or computing devices. For example, database 120 may represent a portion of end-user computing systems 202(1)-(N), server 206, and/or administrator computing system 208 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as end-user computing systems 202(1)-(N), server 206, and/or administrator computing system 208 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include end-user computing systems 202(1)-(N), a server 206, and an administrator computing system 208 in communication via a network 204. One or more of end-user computing systems 202(1)-(N) may be programmed with one or more of modules 102 and/or may store all or a portion of the data in database 120. For example, as shown in FIG. 2, predicting module 106 may represent a portion of a security-policy enforcer 210 that is installed on end-user computing systems 202(1)-(N) and that may be configured to enforce security policies at end-user computing systems 202(1)-(N). In other examples, although not shown in FIG. 2, predicting module 106 may not represent a portion of security-policy enforcer 210. Additionally or alternatively, server 206 and/or administrator computing system 208 may be programmed with one or more of modules 102 and/or may store all or a portion of the data in database 120.

In one embodiment, one or more of modules 102 from FIG. 1 may, when executed by at least one processor of end-user computing systems 202(1)-(N), server 206, and/or administrator computing system 208, facilitate end-user computing systems 202(1)-(N), server 206, and/or administrator computing system 208 in predicting the impact of security-policy changes on users. For example, and as will be described in greater detail below, one or more of modules 102 may cause end-user computing systems 202(1)-(N), server 206, and/or administrator computing system 208 to (1) identify at least one end-user computing system (e.g., one or more of end-user computing systems 202(1)-(N)) that may potentially be regulated using a security policy (e.g., security policy 220), (2) predict, prior to activating the security policy on the end-user computing system, how activating the security policy may impact at least one user of the end-user computing system by monitoring at least one behavior of the user on the end-user computing system and by determining how activating the security policy on the end-user computing system may have impacted the behavior, and (3) notify, based at least in part on predicting how activating the security policy may impact the user, an administrator of the end-user computing system with information that indicates how activating the security policy may impact future user behavior.

End-user computing systems 202(1)-(N) and administrator computing system 208 generally represent any type or form of computing device capable of reading computer-executable instructions. Examples of computing systems 202(1)-(N) and administrator computing system 208 generally include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Server 206 generally represents any type or form of computing device that is capable of reading computer-executable instructions and/or managing security policies for one or more end-user computing systems. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between end-user computing systems 202(1)-(N), server 206, and/or administrator computing system 208.

Figure 3:
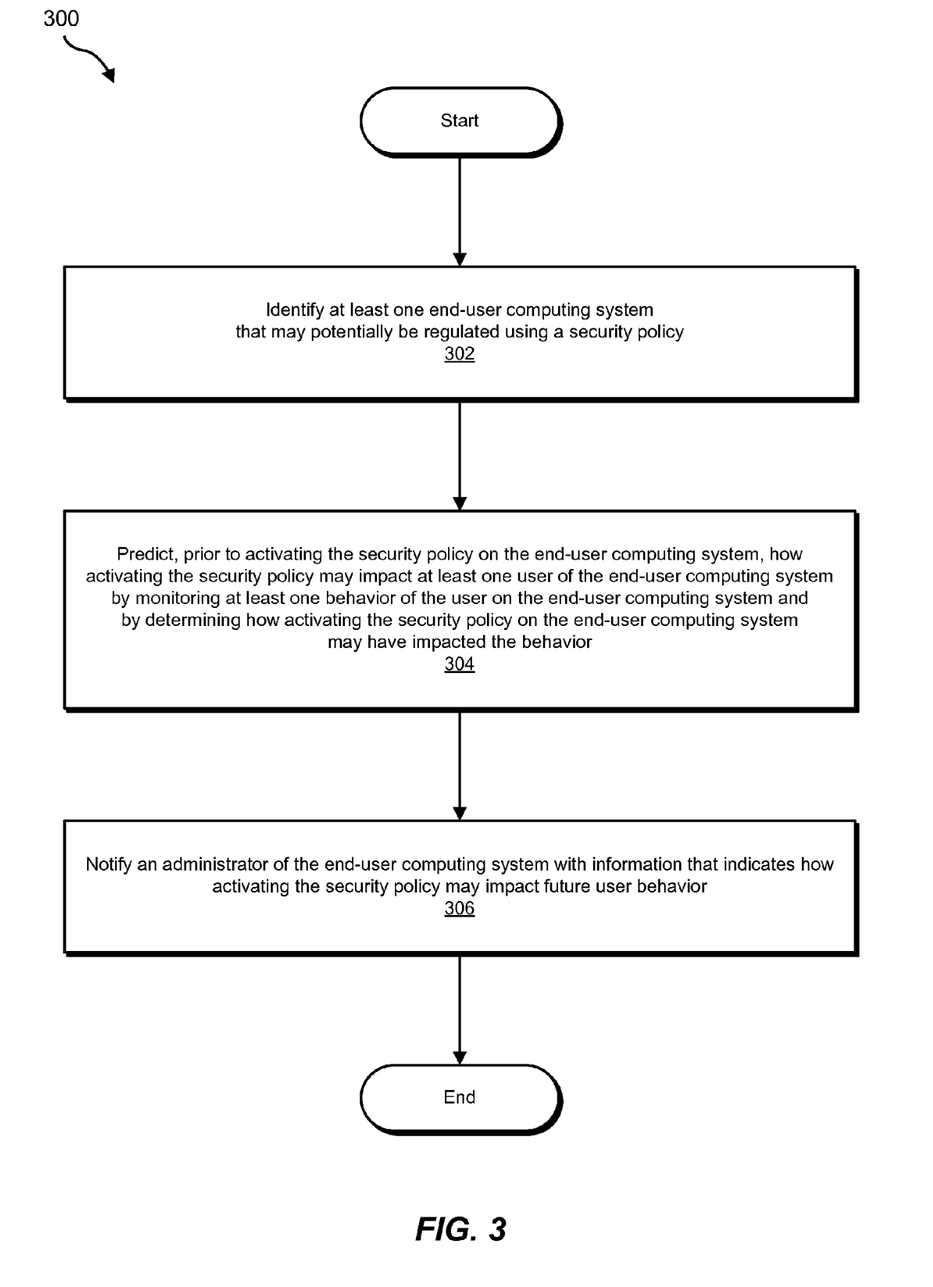
FIG. 3 is a flow diagram of an exemplary method for predicting the impact of security-policy changes on users.

FIG. 3 is a flow diagram of an exemplary computer-implemented method 300 for predicting the impact of security-policy changes on users. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may identify at least one end-user computing system that may potentially be regulated using a security policy. For example, at step 302 identifying module 104 may, as part of server 206 in FIG. 2, identify end-user computing systems 202(1)-(N) that may potentially be regulated using security policy 220.

As used herein, the term "security policy" may generally refer to one or more rules or settings that, when enforced, protect sensitive data and resources on or accessible through end-user computing systems and/or any policy that may, when activated and enforced, directly or indirectly restrict user behavior on end-user computing systems. Examples of security policies include, without limitation, data-loss-prevention policies, access-control policies, antivirus policies, and endpoint-compliance policies.

Security policies may directly, indirectly, intentionally, and/or unintentionally disrupt or restrict user behavior. For example, a security policy may prevent a user from copying sensitive data to an operating-system clipboard, prevent a user from storing sensitive data on a mobile computing system, prevent a user from storing sensitive data unencrypted on a mobile computing system, prevent a user from visiting a website, prevent a user from downloading or installing an application, prevent an application from using computing-system resources (e.g., a camera), and/or prevent an application from sharing data with another application. While security policies are generally created to help protect sensitive data and resources, they may have the potential to cause significant and unexpected disruptions to user workflows and productivity.

The systems described herein may perform step 302 in any suitable manner. In some examples, a security policy may include information that indicates the end-user computing systems on which the security policy should be enforced, and identifying module 104 may identify the end-user computing systems that may potentially be regulated using the security policy by examining this information. For example, security policy 220 in FIG. 2 may include information that indicates that security policy 220 should be enforced on end-user computing systems 202(1)-(N), and identifying module 104 may determine that end-user computing systems 202(1)-(N) may potentially be regulated using security policy 220 by examining this information.

Additionally and/or alternatively, an administrator may request that a security policy be enforced on certain end-user computing systems, and identification module 104 may identify end-user computing systems that may potentially be regulated using the security policy by receiving this request from the administrator. For example, an administrator of end-user computing systems 202(1)-(N) may interact with server 206 via graphical user interface 230 on administrator computing system 208 in order to create, modify, or otherwise manage security policy 220 on server 206 and may indicate that the security policy should be enforced on end-user computing systems 202(1)-(N).

In at least one example, after identifying at least one end-user computing system that may potentially be regulated using a security policy, identifying module 104 may receive a request for information about how the security policy may impact users. For example, identifying module 104 may receive a request from an administrator of end-user computing systems 202(1)-(N) for information about how activating security policy 220 may impact users of end-user computing systems 202(1)-(N).

At step 304, one or more of the systems described herein may predict, prior to activating the security policy on the end-user computing system, how activating the security policy may impact at least one user of the end-user computing system by monitoring at least one behavior of the user on the end-user computing system and by determining how activating the security policy on the end-user computing system may have impacted the behavior. For example, at step 304 predicting module 106 may, as part of one or more of end-user computing systems 202(1)-(N) and/or server 206 in FIG. 2, predict how activating security policy 220 on end-user computing systems 202(1)-(N) may impact users of end-user computing systems 202(1)-(N) by monitoring the behaviors of the users on end-user computing systems 202(1)-(N) and by determining how activating security policy 220 on end-user computing systems 202(1)-(N) may have impacted the behaviors.

As used herein, the term "behavior" may generally refer to any action that a user may perform on an end-user computing system. Examples of behaviors include, without limitation, copying data to an operating-system clipboard, installing or running an application, reading an email, visiting a website, downloading data, using an application that accesses a computing-system resource, using an application that shares data with another application, and/or storing data. The term "behavior" may also refer to any activity that may occur as a result of actions that a user may perform on an end-user computing system. Additional examples of behaviors include, without limitation, an application accessing a computing-system resource or an application sharing data with another application.

The systems described herein may perform step 304 in any suitable manner. In one example, predicting module 106 may deploy security policy 220 to each of end-user computing systems 202(1)-(N) without activating security policy 220 on any of end-user computing systems 202(1)-(N) in order to monitor user behaviors on end-user computing systems 202 (1)-(N) and determine how activating security policy 220 on end-user computing systems 202(1)-(N) may impact the users of end-user computing systems 202(1)-(N). For example, predicting module 106 may send security policy 220 to security-policy enforcer 210 on each of end-user computing systems 202(1)-(N) with instructions to collect information about the behaviors of each user of end-user computing systems 202(1)-(N) that may be impacted by security policy 220.

In some examples, predicting module 106 may then, as part of security-policy enforcer 210 on each of end-user computing systems 202(1)-(N), identify, without enforcing security policy 220, a behavior that may be impacted by security policy 220 by (1) detecting a condition (e.g., the behavior) that may trigger security-policy enforcer 210 to enforce security policy 220, (2) determining that the behavior was the condition, caused the condition and/or occurred simultaneously with the condition, and (3) determining that security-policy enforcer 210 would have blocked or restricted the behavior. For example, predicting module 106 may determine that when a user launched a specific application, security-policy enforcer 210 would have blocked or restricted the user from doing so.

In some examples, predicting module 106 may, after determining that security-policy enforcer 210 would have blocked or restricted the behavior, send information about how the behavior may have been impacted to server 206 and may, as part of server 206, store the information to behavior information 126. For example, predicting module 106 may collect, and send to server 206, information about the context of the behavior and/or a workflow within which the behavior occurred. As used herein, the term "context" may generally refer to information related to the circumstances or conditions surrounding a behavior. For example, the context of a behavior may include information about the identity of the user that performed the behavior (e.g., the user's name, identification number, job title, or department), information that describes the behavior (e.g., the type of the behavior or the data, applications, or websites that were accessed by the behavior), information that identifies the end-user computing device on which the behavior occurred (e.g., a serial number of the end-user computing device and/or a user account associated with the end-user computing device), and/or time, date, or location information. For example, predicting module 106 may, after determining that security-policy enforcer 210 would have blocked or restricted a user from copying and pasting sensitive data between applications, determine that security-policy enforcer 210 would have blocked or restricted the user from copying and pasting a table of sales data from an email that the user was viewing in an email application into a spreadsheet application in order to do certain calculations.

The term "workflow," as used herein, may generally refer to a set or sequence of user behaviors that a user performs while accomplishing a task. For example, a workflow may include viewing an email, downloading a document attached to the email, editing the document, attaching the edited document to a reply email, and sending the reply email. In another example, a workflow may include accessing a set of websites, documents, or applications. In at least one example, predicting module 106 may determine that a workflow may have been impacted by security policy 220 by determining that one or more behaviors associated with the workflow may have been impacted by security policy 220.

In some examples, after collecting information about impacted behaviors for a predetermined length of time (e.g., a length of time requested by an administrator), predicting module 106 may predict how activating security policy 220 on end-user computing systems 202(1)-(N) may impact users of end-user computing systems 202(1)-(N). For example, predicting module 106 may use the information about impacted behaviors to determine the number of times that enforcement of security policy 220 may have impacted each impacted behavior during the predetermined length of time, the number of users that performed each impacted behavior during the predetermined length of time, the number of times that enforcement of security policy 220 may have impacted each user during the predetermined length of time, which users, groups of users, behaviors, contexts, and/or workflows may have been most impacted during the predetermined length of time, and/or how and why activating the security policy on end-user computing systems 202(1)-(N) may have impacted the behaviors of one or more groups of users during the predetermined length of time.

In various examples, predicting module 106 may use these determinations to predict (e.g., by correlating the impact of security policy 220 across groups of associated users) how activating security policy 220 on end-user computing systems 202(1)-(N) may impact future user behavior. For example, predicting module 106 may use these determinations to predict the number of times that enforcement of security policy 220 on end-user computing systems 202(1)-(N) will likely impact specific behaviors, which users, groups of users, behaviors, contexts, and/or workflows are most likely to be impacted, the number of users that will likely attempt to perform specific behaviors, how and why activating security policy 220 on end-user computing systems 202(1)-(N) will likely impact a user (e.g., a corporate executive) or group of users (e.g., a corporate department) of interest. In at least one example, predicting module 106 may store these predictions to prediction information 124.

At step 306, one or more of the systems described herein may notify, based at least in part on predicting how activating the security policy may impact the user, an administrator of the end-user computing system with information that indicates how activating the security policy may impact future user behavior. For example, at step 306 notifying module 108 may, as part of server 206 and/or administrator computing system 208 in FIG. 2, notify an administrator of end-user computing systems 202(1)-(N) with information that indicates how activating security policy 220 may impact future user behavior on end-user computing systems 202(1)-(N).

The systems described herein may perform step 306 in any suitable manner. In one example, notifying module 108 may display to the administrator of end-user computing systems 202(1)-(N) via graphical user interface 230 the information collected and predicted as part of step 304. For example, notifying module 108 may display to the administrator of end-user computing systems 202(1)-(N) information that indicates the number of times that enforcement of security policy 220 on end-user computing systems 202(1)-(N) will likely impact specific behaviors, which users, groups of users, behaviors, contexts, and/or workflows are most likely to be impacted, the number of users that will likely attempt to perform specific behaviors, how and why activating security policy 220 on end-user computing systems 202(1)-(N) will likely impact a user or group of users of interest.

By providing the administrator of end-user computing systems 202(1)-(N) with information that indicates how activating security policy 220 on end-user computing systems 202 (1)-(N) may impact and/or disrupt future user behavior, notifying module 108 may enable the administrator to understand how many users may actually be affected by security policy 220, how a specific user or group of users may actually be affected by security policy 220, and/or whether security policy 220 is likely to cause significant disruptions to user workflows and productivity. Upon completion of step 306, exemplary method 300 in FIG. 3 may terminate.

In some examples, in addition to providing the administrator of end-user computing systems 202(1)-(N) with information that indicates how activating security policy 220 may impact future user behavior on end-user computing systems 202(1)-(N), notification module 108 may also provide at least one user of end-user computing systems 202(1)-(N) with similar information. In at least one example, by providing users with information that indicates how activating security policy 220 may impact future user behavior, notifying module 108 may enable the users to adjust their behaviors to reduce any undesired impacts of security policy 220.

In some examples, after providing the administrator of end-user computing systems 202(1)-(N) with information that indicates how activating security policy 220 may impact future user behavior on end-user computing systems 202(1)-(N), one or more of the systems described herein may enable the administrator to adjust security policy 220 prior to activating security policy 220 on end-user computing systems 202(1)-(N). In at least one example, if the administrator chooses to adjust security policy 220, one or more of the systems described herein may predict how activating the adjusted security policy 220 on end-user computing systems 202(1)-(N) may impact users.

In some examples, after notifying the administrator of end-user computing systems 202(1)-(N) with information that indicates how activating security policy 220 may impact future user behavior on end-user computing systems 202(1)-(N), activating module 110 may activate security policy 220 on end-user computing systems 202(1)-(N). In at least one example, activating module 110 may activate security policy 220 in response to receiving a request from the administrator to activate security policy 220 on end-user computing systems 202(1)-(N) and may, in response to the request, activate security policy 220 so that security policy 220 is subsequently enforced by security-policy enforcer 210 on end-user computing systems 202(1)-(N).

Figure 4:
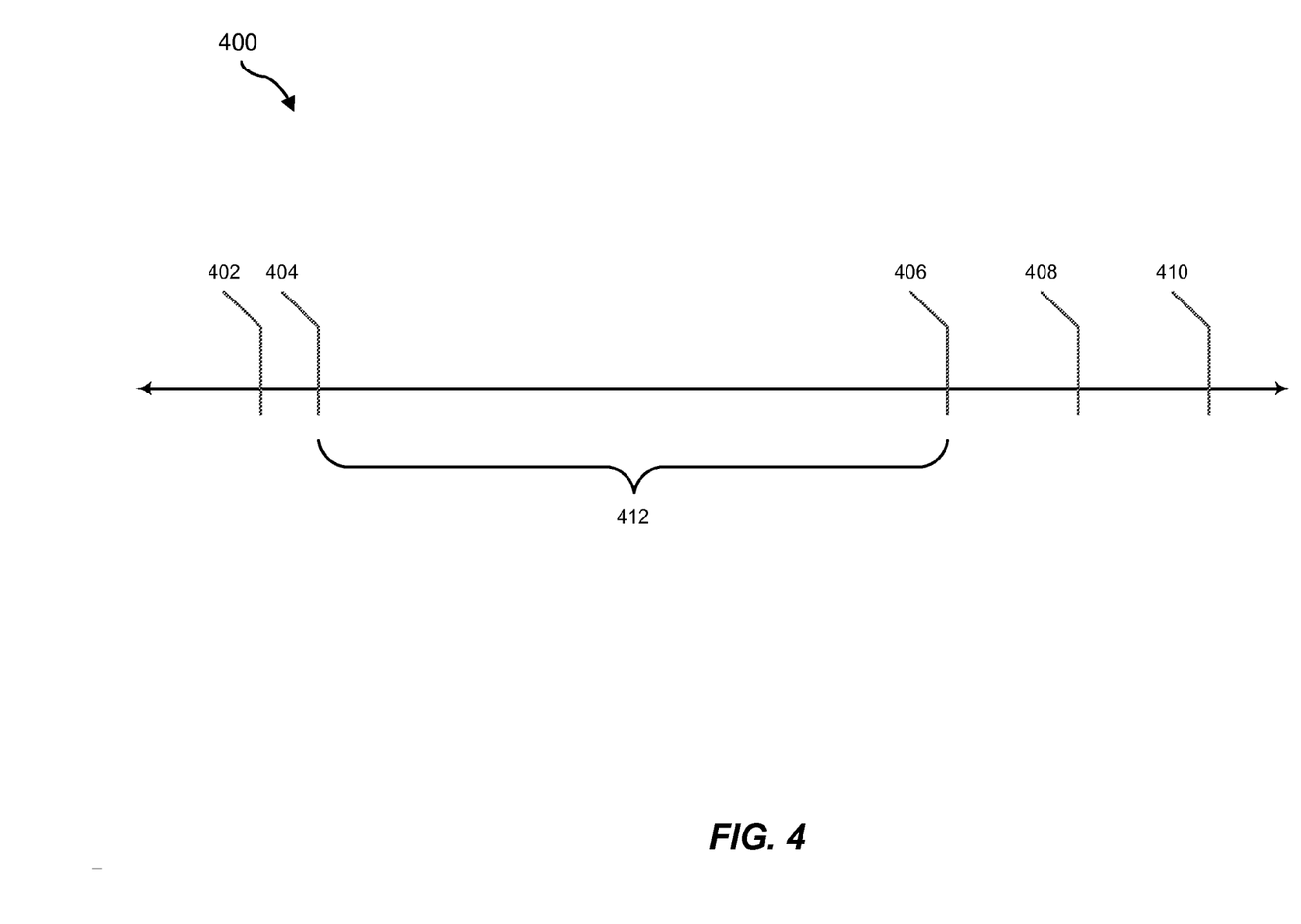
FIG. 4 is a diagram of an exemplary timeline for predicting the impact of security-policy changes on users.

The systems and methods described herein may perform the steps illustrated in FIG. 3 at various times. FIG. 4 illustrates an exemplary timeline 400 for performing some of the steps, described above, for predicting the impact of security-policy changes on users of end-user computing systems 202 (1)-(N) in FIG. 2. As shown, at time 402, identifying module 104 may, as part of server 206 in FIG. 2, identify end-user computing systems 202(1)-(N) that may be regulated using security policy 220. At time 404, predicting module 106 may deploy security policy 220 to end-user computing systems 202(1)-(N) without activating security policy 220 and may begin monitoring user behaviors on end-user computing systems 202(1)-(N).

While monitoring user behaviors during time period 412, predicting module 106 may use security policy 220 to collect information (e.g., context and workflow information) about user behaviors that may have been impacted had security policy 220 been activated and enforced by security-policy enforcer 210. At time 406, predicting module 106 may stop monitoring user behaviors on end-user computing systems 202(1)-(N) and may use the collected information about impacted user behaviors to predict how activating security policy 220 may impact users of end-user computing systems 202(1)-(N). At time 408, notifying module 108 may then provide an administrator of end-user computing systems 202 (1)-(N) with information that indicates how activating security policy 220 may impact future user behavior on end-user computing systems 202(1)-(N). Finally at step 410, activating module 110 may activate security policy 220 on end-user computing systems 202(1)-(N), after which security policy 220 may be enforced by security-policy enforcer 210 on end-user computing systems 202(1)-(N). Although not shown in at least one example, predicting module 106 may monitor and collect information about user behaviors on end-user computing systems 202(1)-(N) prior to time 402.

As explained above, by predicting, prior to activating new or modified security policies on end-user computing systems, how activating the security policies may impact users of the end-user computing systems, the systems and methods described herein may reduce or eliminate unexpected disruptions to user behaviors. Furthermore, in some examples, by collecting, prior to activating the security policies on end-user computing systems, information about behaviors that may be disrupted by enforcement of the security policies on the end-user computing systems, the systems and methods described herein may accurately predict how actual enforcement of the security policies will likely impact the future behavior of specific users or groups of user of interest.

Moreover, by providing to an administrator and/or users of the end-user computing systems information about how enforcement of the security policies on the end-user computing systems will likely impact future user behavior, these systems and methods may enable the administrator to adjust the security policies to reduce or eliminate any undesired impacts of the security policies and/or enable the users to prepare for any likely disruptions caused by the security policies.

For example, the systems and methods described herein may (1) receive, from an administrator, a new or modified security policy that is to be activated and enforced on one or more end-user computing systems and that may disruptively restrict user behavior on the one or more end-user computing systems, (2) determine, before activating the security policy, how the new or modified security policy may impact users of the one or more end-user computing systems, and (3) notify the administrator and/or the users of the one or more end-user computing systems with information that indicates the possible impact of activating the security policy on the one or more end-user computing systems. In some examples, the systems and methods described herein may also enable the administrator to adjust the security policy before activating the security policy on the one or more end-user computing systems.

Figure 5:
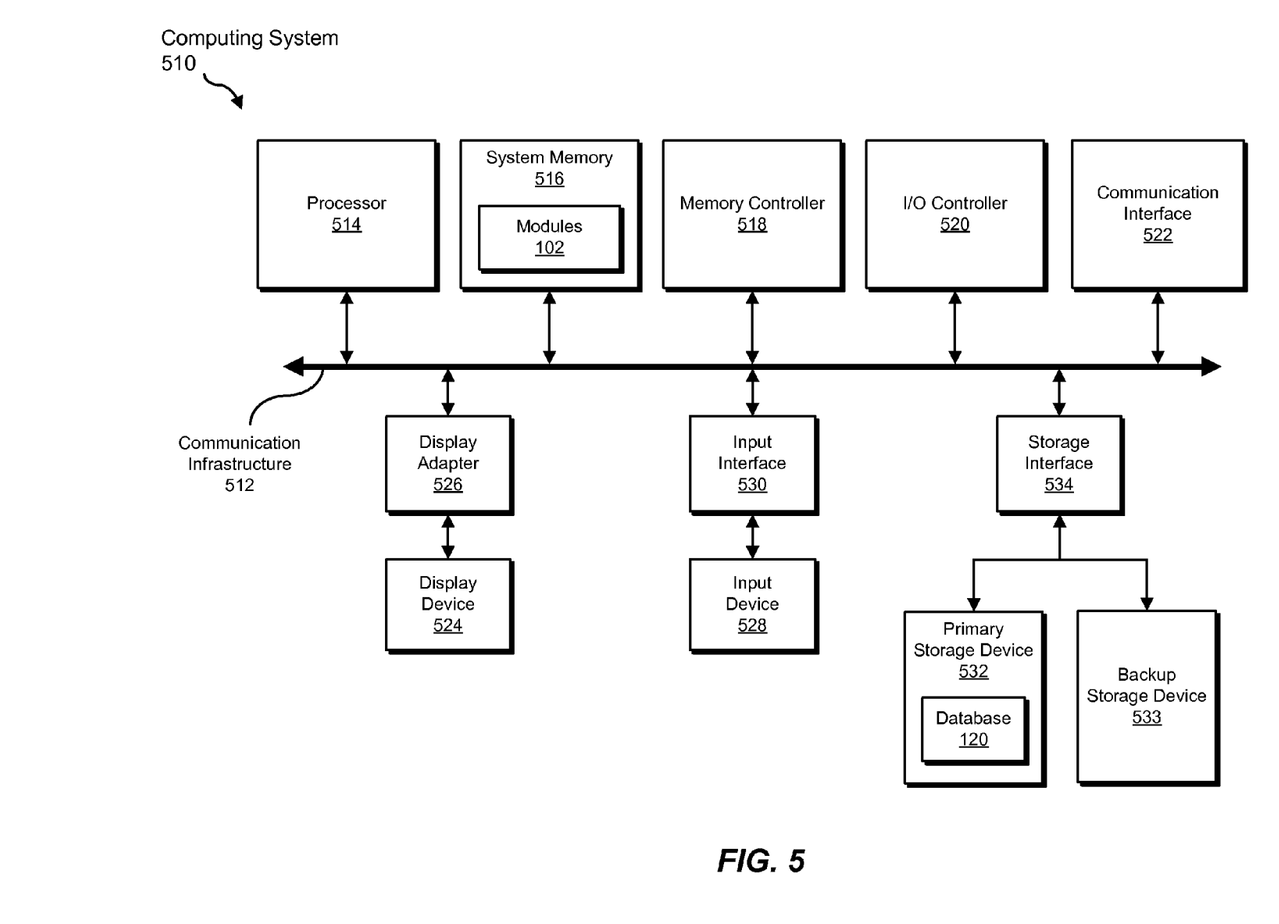
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the predicting, identifying, monitoring, determining, notifying, detecting, enabling, and activating steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
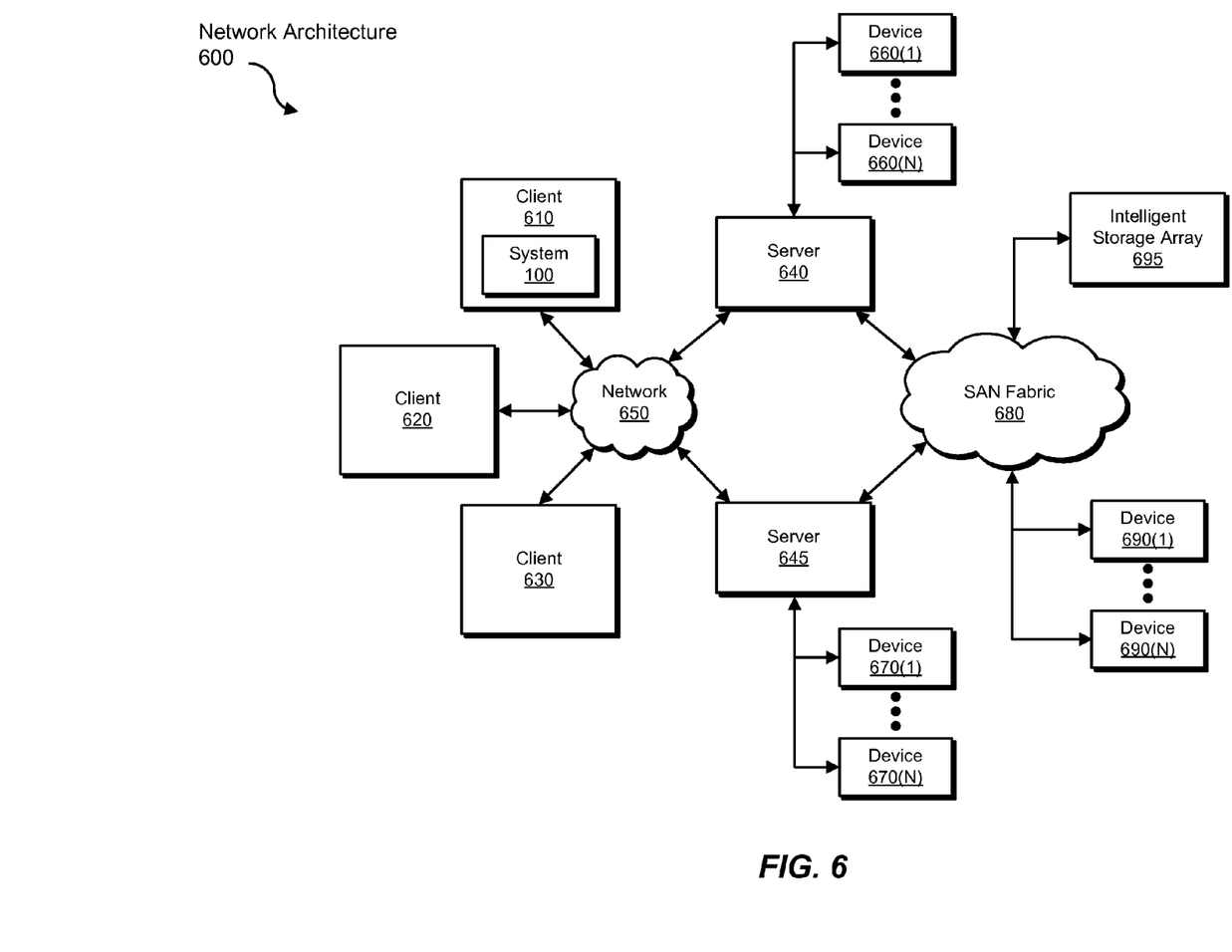
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the predicting, identifying, monitoring, determining, notifying, detecting, enabling, and activating steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for predicting the impact of security-policy changes on users.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a security policy to be transformed (e.g., any security policy that may restrict user behavior on one or more end-user computing systems), transform the security policy into information that indicates how activating the security policy on one or more end-user computing systems may impact future user behavior, output a result of the transformation to an administrator of the security policy, use the result of the transformation to enable the administrator of the security policy to adjust the security policy and/or warn users that may be impacted by the security policy, and store the result of the transformation to a database configured to store prediction information. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for predicting the impact of security-policy changes on users, at least a portion of the method being performed by a computing device comprising at least one processor, the method comprising:
   identifying at least one end-user computing system that is potentially to be regulated using a new security policy potentially to be activated by an administrator of the end-user computing system;
   predicting, prior to activating the new security policy on the end-user computing system, how activating the new security policy will impact at least one user of the end-user computing system by:
   deploying the new security policy to the end-user computing system;
   monitoring, over a time period of live user activity on the end-user computing system, at least one behavior of the user on the end-user computing system for evaluation against the new security policy responsive to determining that the new security policy is potentially to be activated;
   determining, without notifying the user of the new security policy and without having first activated the new security policy, how activating the new security policy on the end-user computing system would have impacted the behavior by:
   detecting, at the end-user computing system, a condition that would have triggered enforcement of the new security policy on the end-user computing system;
   determining that the behavior comprised the condition, caused the condition, and/or occurred simultaneously with the condition;
   determining, in response to detecting the condition that would have triggered enforcement of the new security policy, that enforcement of the new security policy on the end-user computing system would have impacted the behavior;
   notifying, based at least in part on predicting how activating the new security policy will impact the user, the administrator of the end-user computing system with information that indicates how activating the new security policy will impact future user behavior.

2. The computer-implemented method of claim 1, wherein determining how activating the new security policy on the end-user computing system would have impacted the behavior further comprises identifying, in response to detecting the condition that would have triggered enforcement of the new security policy on the end-user computing system, the context within which enforcement of the new security policy on the end-user computing system would have impacted the behavior.

3. The computer-implemented method of claim 1, wherein determining how activating the new security policy on the end-user computing system would have impacted the behavior further comprises identifying, in response to detecting the condition that would have triggered enforcement of the new security policy on the end-user computing system, a workflow within which enforcement of the new security policy on the end-user computing system would have impacted the behavior.

4. The computer-implemented method of claim 1, wherein predicting how activating the new security policy will impact the user of the end-user computing system further comprises determining, based at least in part on determining how activating the new security policy on the end-user computing system would have impacted the behavior, at least one of:
   a number of times that enforcement of the new security policy on the end-user computing system would have impacted the behavior while the behavior is monitored;
   a number of users that perform the behavior while the behavior is monitored;
   how activating the new security policy on the end-user computing system would have impacted the behavior of a group of users to which the user belongs.

5. The computer-implemented method of claim 1, wherein notifying the administrator with information that indicates how activating the new security policy will impact future user behavior comprises notifying the administrator of at least one of:
   a number of times that enforcement of the new security policy on the end-user computing system will likely impact the behavior after the new security policy is activated on the end-user computing system;
   a number of users that will likely attempt to perform the behavior after the new security policy is activated on the end-user computing system;
   how activating the new security policy on the end-user computing system will likely impact the behavior of a user of interest;
   how activating the new security policy on the end-user computing system will likely impact the behavior of a group of users of interest.

6. The computer-implemented method of claim 1, further comprising at least one of:
   notifying the user with information that indicates how activating the new security policy will impact future user behavior;
   enabling the administrator to adjust the new security policy prior to activating the new security policy on the end-user computing system;
   activating the new security policy on the end-user computing system.

7. A system for predicting the impact of security-policy changes on users, the system comprising:
   an identifying module, stored in memory as software, that identifies at least one end-user computing system that is potentially to be regulated using a new security policy potentially to be activated by an administrator of the end-user computing system;
   a predicting module, stored in memory as software, that predicts, prior to activating the new security policy on the end-user computing system, how activating the new security policy will impact at least one user of the end-user computing system by:
      deploying the new security policy to the end-user computing system;
      monitoring, over a time period of live user activity on the end-user computing system, at least one behavior of the user on the end-user computing system for evaluation against the new security policy responsive to determining that the new security policy is potentially to be activated;
      determining, without notifying the user of the new security policy and without having first activated the new security policy, how activating the new security policy on the end-user computing system would have impacted the behavior by:
         detecting, at the end-user computing system, a condition that would have triggered enforcement of the new security policy on the end-user computing system;
         determining that the behavior comprised the condition, caused the condition, and/or occurred simultaneously with the condition;
         determining, in response to detecting the condition that would have triggered enforcement of the new security policy, that enforcement of the new security policy on the end-user computing system would have impacted the behavior;
   a notifying module, stored in memory as software, that notifies, based at least in part on predicting how activating the new security policy will impact the user, the administrator of the end-user computing system with information that indicates how activating the new security policy will impact future user behavior;
   at least one hardware processor configured to execute the identifying module, the predicting module, and the notifying module.

8. The system of claim 7, wherein the predicting module is programmed to determine how activating the new security policy on the end-user computing system would have impacted the behavior by identifying, in response to detecting the condition that would have triggered enforcement of the new security policy on the end-user computing system, the context within which enforcement of the new security policy on the end-user computing system would have impacted the behavior.

9. The system of claim 7, wherein the predicting module is programmed to determine how activating the new security policy on the end-user computing system would have impacted the behavior by identifying, in response to detecting the condition that would have triggered enforcement of the new security policy on the end-user computing system, a workflow within which enforcement of the new security policy on the end-user computing system would have impacted the behavior.

10. The system of claim 7, wherein the predicting module is programmed to predict how activating the new security policy will impact the user of the end-user computing system by determining, based at least in part on determining how activating the new security policy on the end-user computing system would have impacted the behavior, at least one of:
   a number of times that enforcement of the new security policy on the end-user computing system would have impacted the behavior while the behavior is monitored;
   a number of users that perform the behavior while the behavior is monitored;
   how activating the new security policy on the end-user computing system would have impacted the behavior of a group of users to which the user belongs.

11. The system of claim 7, wherein the notifying module is programmed to notify the administrator with information that indicates how activating the new security policy will impact future user behavior by notifying the administrator of at least one of:
   a number of times that enforcement of the new security policy on the end-user computing system will likely impact the behavior after the new security policy is activated on the end-user computing system;
   a number of users that will likely attempt to perform the behavior after the new security policy is activated on the end-user computing system;
   how activating the new security policy on the end-user computing system will likely impact the behavior of a user of interest;
   how activating the new security policy on the end-user computing system will likely impact the behavior of a group of users of interest.

12. The system of claim 7, wherein:
   the notifying module is further programmed to:
   notify the user with information that indicates how activating the new security policy will impact future user behavior;
   enable the administrator to adjust the new security policy prior to activating the new security policy on the end-user computing system;
   the system further comprises an activating module programmed to activating the new security policy on the end-user computing system.

13. A non-transitory computer-readable medium comprising one or more computer-executable instructions that, when executed by at least one processor of a computing device, cause the computing device to:
   identify at least one end-user computing system that is potentially to be regulated using a new security policy potentially to be activated by an administrator of the end-user computing system;
   predict, prior to activating the new security policy on the end-user computing system, how activating the new security policy will impact at least one user of the end-user computing system by:
      deploying the new security policy to the end-user computing system;
      monitoring, over a time period of live user activity on the end-user computing system, at least one behavior of the user on the end-user computing system for evaluation against the new security policy responsive to determining that the new security policy is potentially to be activated;

determining, without notifying the user of the new security policy and without having first activated the new security policy, how activating the new security policy on the end-user computing system would have impacted the behavior by:

detecting, at the end-user computing system, a condition that would have triggered enforcement of the new security policy on the end-user computing system;

determining that the behavior comprised the condition, caused the condition, and/or occurred simultaneously with the condition;

determining, in response to detecting the condition that would have triggered enforcement of the new security policy, that enforcement of the new security policy on the end-user computing system would have impacted the behavior;

notify, based at least in part on predicting how activating the new security policy will impact the user, the administrator of the end-user computing system with information that indicates how activating the new security policy will impact future user behavior.

14. The non-transitory computer-readable medium of claim 13, wherein the one or more computer-executable instructions, when executed by the processor of the computing device, further cause the computing device to determine how activating the new security policy on the end-user computing system would have impacted the behavior by identifying, in response to detecting the condition that would have triggered enforcement of the new security policy on the end-user computing system, the context within which enforcement of the new security policy on the end-user computing system would have impacted the behavior.

15. The non-transitory computer-readable medium of claim 13, wherein the one or more computer-executable instructions, when executed by the processor of the computing device, further cause the computing device to determine how activating the new security policy on the end-user computing system would have impacted the behavior by identifying, in response to detecting the condition that would have triggered enforcement of the new security policy on the end-user computing system, a workflow within which enforcement of the new security policy on the end-user computing system would have impacted the behavior.

16. The non-transitory computer-readable medium of claim 13, wherein the one or more computer-executable instructions, when executed by the processor of the computing device, further cause the computing device to predict how activating the new security policy will impact the user of the end-user computing system by determining, based at least in part on determining how activating the new security policy on the end-user computing system would have impacted the behavior, at least one of:

a number of times that enforcement of the new security policy on the end-user computing system would have impacted the behavior while the behavior is monitored;

a number of users that perform the behavior while the behavior is monitored;

how activating the new security policy on the end-user computing system would have impacted the behavior of a group of users to which the user belongs.

17. The non-transitory computer-readable medium of claim 13, wherein the one or more computer-executable instructions, when executed by the processor of the computing device, further cause the computing device to notify the administrator with information that indicates how activating the new security policy will impact future user behavior by notifying the administrator of at least one of:

a number of times that enforcement of the new security policy on the end-user computing system will likely impact the behavior after the new security policy is activated on the end-user computing system;

a number of users that will likely attempt to perform the behavior after the new security policy is activated on the end-user computing system;

how activating the new security policy on the end-user computing system will likely impact the behavior of a user of interest;

how activating the new security policy on the end-user computing system will likely impact the behavior of a group of users of interest.

\* \* \* \* \*